A. HOWATSON.
APPARATUS FOR SEPARATING SOLID IMPURITIES FROM WATER.
No. 344,740. Patented June 29, 1886.
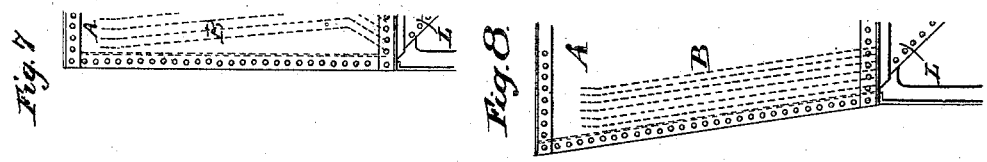
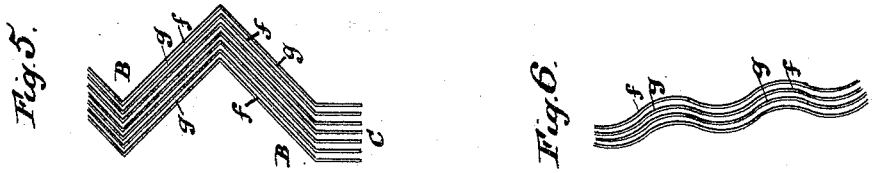
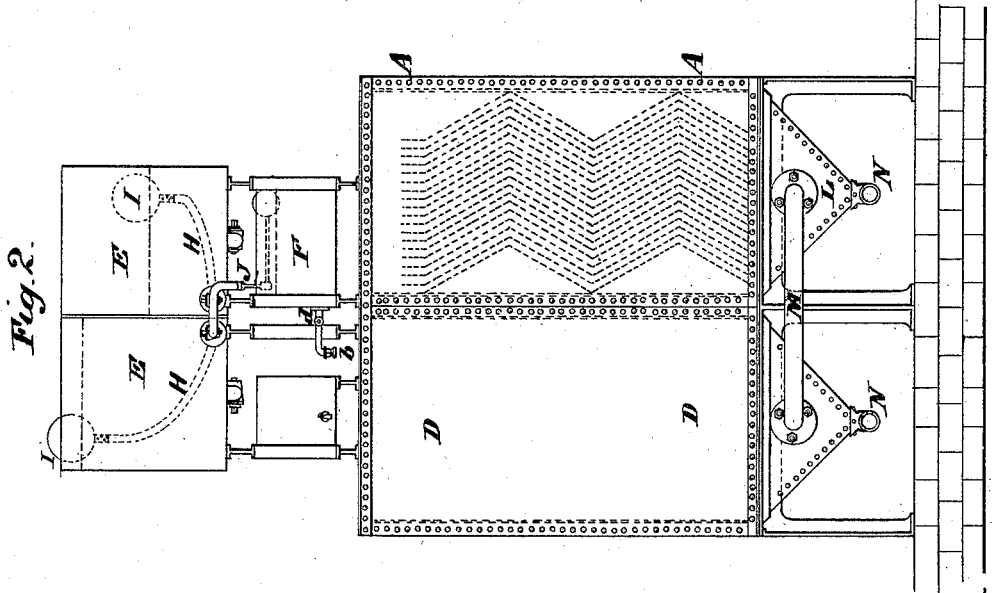
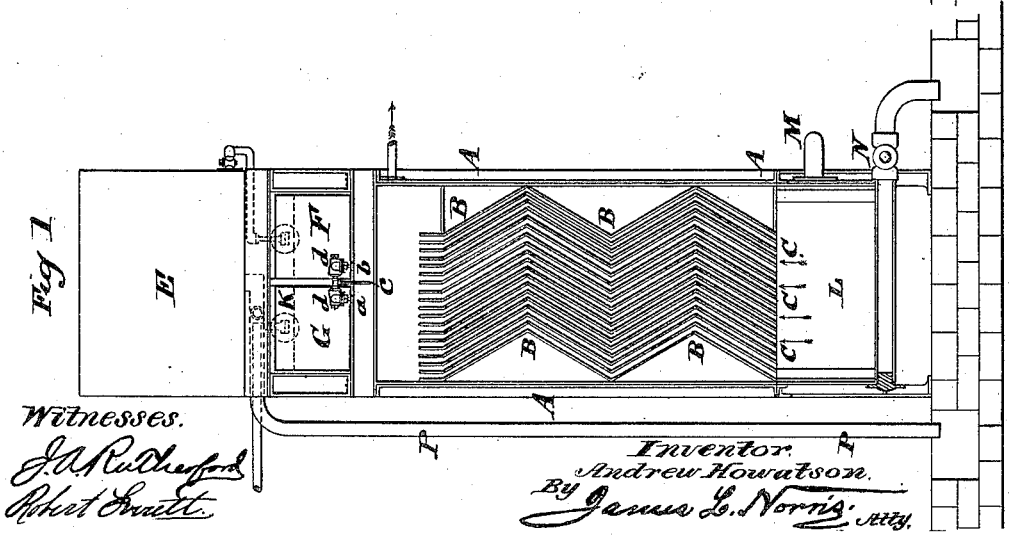
Witnesses.
J. A. Rutherford
Robert Smitt
Inventor
Andrew Howatson.
By James L. Norris, Atty.

UNITED STATES PATENT OFFICE.

ANDREW HOWATSON, OF LAVENDER HILL, COUNTY OF SURREY, ENGLAND.

APPARATUS FOR SEPARATING SOLID IMPURITIES FROM WATER.

SPECIFICATION forming part of Letters Patent No. 344,740, dated June 29, 1886.

Application filed March 4, 1886. Serial No. 194,061. (No model.) Patented in England May 23, 1885, No. 6,351.

*To all whom it may concern:*

Be it known that I, ANDREW HOWATSON, a subject of the Queen of Great Britain, residing at Lavender Hill, Surrey, England, have invented new and useful Improvements in Apparatus for Separating Solid Impurities from Water or other Liquids, (for which I have obtained a patent in Great Britain, No. 6,351, bearing date May 23, 1885,) of which the following is a specification.

My invention has for its object to provide a cheap, ample, and efficient apparatus for separating solid impurities from water or other liquids containing them.

According to my invention I arrange inside a vessel a number of plates of angled, corrugated, fluted, or of zigzag form, either in themselves or set to assume one or other of those conditions, so as to form between them a series of passages, all tending upward. The said passages are open top and bottom. They communicate at the bottom with the inlet for liquid and at the top with the outlet. At the lower part of the vessel is arranged a receptacle for receiving the solid matter which deposits upon and slides down from the said plates.

The apparatus can be made of any shape; but I prefer the square or rectangular form, and when intended to be employed for the purposes of softening and purifying water is constructed as follows, and substantially as shown in the annexed drawings, wherein—

Figure 1 is a view partly in side elevation and partly in section. Fig. 2 is a front elevation. Figs. 3, 4, 5, and 6 are detail views showing different forms of plates. Figs. 7 and 8 are detail views showing modified methods of arranging the gravitation-plates.

A is the outside casing, which, with angled, or they may be corrugated, plates B B, can be made of any suitable metal. C C are the spaces between the plates B B, for the passage of the liquid. D is the mixing-chamber; E, the lime, soda, or other chemical mixing-tanks; F, the chemical-regulating tank; G, the water or other liquid regulating tank.

When the chemical purifying agents—such as are ordinarily used for purifying water—have been prepared in the tank E, the liquid is allowed to flow into the regulating-tank F, by means of the flexible pipe H, which is fitted with a float, I, so as to turn off the surface or clear liquid. To the bottom of the tank E is fitted a ball-valve, J, so that a constant level is always maintained in the regulating-tank F. The tank G is also fitted with a ball-valve, K, so that both tanks F, containing the chemicals, and G, containing water or other liquid to be purified, have always a constant level.

When the quantity of liquid to be purified is ascertained, and the quantity of chemical purifying agent required has been prepared, the water to be purified and the purifying-liquid are allowed to flow down through the nozzles *a* and *b*, which are fitted onto the cocks *d d*, a stated quantity being in each case allowed to pass in such a manner that the level in the two tanks G F always remains constant. A handle, *c*, is fitted so as to work the two cocks *d d*, so that on turning the handle *c* the nozzle *a* runs the quantity of liquid to be purified, and *b* runs the quantity of chemical liquid for the purification, the simultaneous opening of the two cocks allowing the proper proportions of each liquid to flow into the mixing-chamber D. This chamber D is made large enough to allow the completion of the chemical action before the liquid enters the subsidence apparatus A. The liquid passes by the pipe M into the bottom of the subsidence apparatus A, and then finds its way up between the corrugated partitions, leaving in its course the solid impurities on the upper inclined surfaces of the plates, and finally issues at the top pure and ready for use.

The liquid in its upward travel through the passages C impinges against the upper surface, *f*, of the angled passage, as will be understood by reference to Fig. 5, (which is an enlarged view of the angled plates, or they may be corrugated plates, as at Fig. 6,) and, by continually changing its course in passing through the several passages formed by the plates, it is, so to speak, broken up, and the solid impurities which it contains are caused to deposit themselves upon the surface *g* of the angled passage, so that before the liquid reaches the top channel or corrugation the whole of the impurities will have been precipitated onto the surfaces *g* of the plates by the action of gravitation, and as the impurities accumulate on the several surfaces *g* of the channels or corrugations they slide down and finally fall into the chamber L, to be drawn off by the sludge-cock N.

The apparatus will work equally well if it is filled with plates, as shown in Figs. 3, 4, and 7.

P is a pipe by which the solid deposits are drawn from the tank E, when required.

I am aware that water treated chemically for the separation of impurities has been proposed to be passed through or between angled or other plates; but these plates have been connected to the sides of the vessel alternately, so as to cause the liquid to pass in a zigzag manner in an upward direction; but the plates thus arranged have not acted advantageously, because portions of the liquid become more or less pocketed in the upper parts of the angles after the vessel was charged, and the portions thus pocketed were kept agitated by the upward current, but the impurities did not deposit themselves.

I am also aware that angled plates have been fitted to the sides of a precipitating-tank, all the said plates being set in the same direction, consequently the liquid had first to flow up and then down alternately, and when the liquid was very foul the deposits in the lower passages accumulated so rapidly as to impair the necessary flow of liquid through the apparatus.

By my invention the plates are so arranged that the liquid is always rising in an upward direction between the plates, and by means of my improved arrangement the water is divided into thin sheets or films, and the deposit of the impurities is consequently effected with greater ease and efficiency than by any previously-known arrangement of apparatus.

It may be advantageous with certain liquids to adopt the arrangement of plates as shown at Fig. 8; but a greater space between the plates must be allowed for the passage of the liquid, so that the current will not interfere with the precipitation of the solid matter.

I claim as my invention—

1. In an apparatus for separating solid impurities from liquids, the combination, with an inclosing-chamber, of zigzag plates arranged in said chamber in parallelism and in close contiguity, but having intermediate spaces, said plates and interspaces having an upward inclination at all points, substantially as described.

2. In an apparatus for separating solid impurities from liquids, the combination, with a suitable chamber, of angled plates having interspaces arranged in parallel order and leading upward at all points at an angle with the perpendicular, substantially as described.

3. In an apparatus for separating solid impurities from liquids, the combination, with a chamber, of a series of plates which incline from the perpendicular at two or more points, said plates being arranged in parallelism and having narrow interspaces which have an upward inclination at all points, means for driving the liquid upward between said plates, and a sludge-chamber which receives the solid precipitates, substantially as described.

In witness whereof I have hereunto signed by name in the presence of two subscribing witnesses.

ANDREW HOWATSON.

Witnesses:
  HENRY GARDNER,
  RICHARD CORE GARDNER,
Both of 166 Fleet Street, London, England.